United States Patent
Buxton et al.

(10) Patent No.: US 6,429,257 B1
(45) Date of Patent: Aug. 6, 2002

(54) POLYURETHANE CASTING SYSTEM AND METHOD

(75) Inventors: Richard L. Buxton; Erik M. Parker, both of Boise, ID (US)

(73) Assignee: Weyerhaeuser Company, Federal Way, WA (US)

(*) Notice: Subject to any disclaimer, the term of this patent is extended or adjusted under 35 U.S.C. 154(b) by 0 days.

(21) Appl. No.: 09/339,689

(22) Filed: Jun. 24, 1999

(51) Int. Cl.[7] .............................. C08K 3/14; C08K 3/18; C08K 3/28; C08K 3/30
(52) U.S. Cl. ........................ 524/788; 524/425; 524/590; 524/310
(58) Field of Search ................................ 524/425, 590, 524/788, 310, 589

(56) References Cited

U.S. PATENT DOCUMENTS

| | | | |
|---|---|---|---|
| 3,382,119 A | 5/1968 | Henkel | 156/71 |
| 3,401,141 A | 9/1968 | Toth | 260/37 |
| 3,959,192 A | 5/1976 | Delfosse et al. | 260/2.5 R |
| 3,959,210 A | 5/1976 | Lipatova et al. | 260/42.13 |
| 4,153,768 A | 5/1979 | Blount | 521/155 |
| 4,200,565 A | 4/1980 | Naughton | 260/31.6 |
| 4,210,572 A | 7/1980 | Herman et al. | 260/40 R |
| 4,259,231 A | 3/1981 | Tomomoto et al. | 260/42.52 |
| 4,274,987 A | 6/1981 | Augustyn | 260/23 H |
| 4,304,706 A | 12/1981 | Urs | 260/31.4 |
| 4,345,044 A | 8/1982 | Columbus et al. | 523/220 |
| 4,352,906 A | 10/1982 | Reed et al. | 524/426 |
| 4,367,259 A | 1/1983 | Fulmer et al. | 428/240 |
| 4,403,064 A | 9/1983 | Heine | 524/494 |
| 4,439,577 A | 3/1984 | O'Connor et al. | 524/425 |
| 4,443,577 A | 4/1984 | Higgins et al. | 524/590 |
| 4,451,605 A | 5/1984 | Theodore | 524/423 |
| 4,454,267 A | 6/1984 | Williams | 524/43 |
| 4,522,917 A | 6/1985 | Ichijima et al. | 430/564 |
| 4,522,969 A | 6/1985 | O'Connor et al. | 524/425 |
| 4,544,730 A | 10/1985 | O'Connor et al. | 528/78 |
| 4,552,917 A | 11/1985 | O'Connor et al. | 524/590 |
| 4,552,943 A | 11/1985 | O'Connor et al. | 528/50 |
| 4,562,215 A | 12/1985 | Carter et al. | 523/220 |
| 4,816,509 A | 3/1989 | Fukushima et al. | 524/413 |
| 4,835,195 A | 5/1989 | Rayfield et al. | 523/220 |
| 4,871,789 A | 10/1989 | Martinez | 523/220 |
| 4,898,620 A | 2/1990 | Rayfield et al. | 106/464 |
| 4,902,736 A | 2/1990 | Nonaka et al. | 524/296 |
| 4,918,127 A | 4/1990 | Adur et al. | 524/415 |
| 4,943,603 A | 7/1990 | Martinez | 523/220 |
| 4,962,151 A | 10/1990 | Mellon | 524/788 |
| 5,034,453 A | 7/1991 | Takada et al. | 524/590 |
| 5,037,879 A | 8/1991 | Roberts | 524/590 |
| 5,166,300 A | 11/1992 | Rumon et al. | 528/65 |
| 5,278,223 A | 1/1994 | Gruenewaelder et al. | 524/502 |
| 5,290,632 A | 3/1994 | Jadhav et al. | 428/423.1 |
| 5,331,044 A | 7/1994 | Lausberg et al. | 524/871 |
| 5,342,873 A | 8/1994 | Merz et al. | 524/425 |
| 5,344,490 A | 9/1994 | Roosen et al. | 106/778 |
| 5,385,966 A | 1/1995 | Hermansen et al. | 524/426 |
| 5,459,185 A | 10/1995 | Nakata et al. | 524/227 |
| 5,508,111 A | 4/1996 | Schmucker | 428/423.1 |
| 5,603,798 A | 2/1997 | Bhat | 156/331.4 |
| 5,631,318 A | 5/1997 | Ito et al. | 524/590 |
| 5,643,983 A | 7/1997 | Lee | 524/267 |
| 5,668,211 A | 9/1997 | Dormish | 524/590 |
| 5,672,652 A | 9/1997 | Bhat | 524/590 |
| 5,744,530 A | 4/1998 | Skelhorn | 524/427 |
| 5,747,581 A | 5/1998 | Proebster et al. | 524/590 |
| 5,798,411 A | 8/1998 | Riazi | 524/590 |
| 5,852,103 A | 12/1998 | Bhat | 524/590 |
| 5,883,172 A | 3/1999 | Heucher et al. | 524/425 |

*Primary Examiner*—James J. Seidleck
*Assistant Examiner*—U. K Rajguru

(57) ABSTRACT

A mixture, casting system and method for forming a polyurethane product. The mixture typically includes a slurry including an alcohol containing at least two hydroxyl groups, and calcium carbonate. Typically, the calcium carbonate is present in the slurry in a range of between about 40% and 70% by weight. The mixture also includes an isocyanate mixed into the slurry such that isocyanate forms between about 10% and 50% by weight of the resulting mixture, the remainder of the resulting mixture being slurry. The mixture also may include a chain extender, cross-linking agent, or polymerization catalyst.

43 Claims, 7 Drawing Sheets

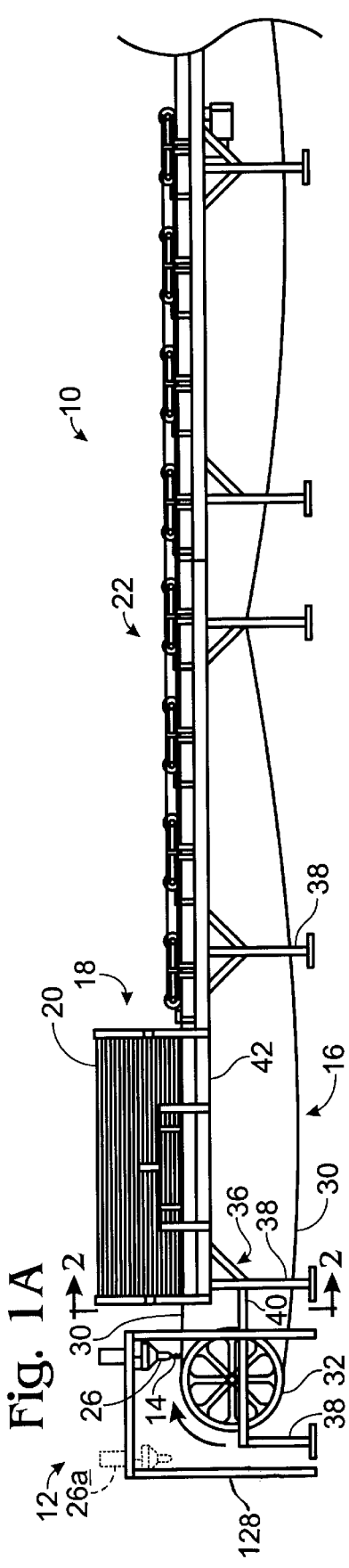
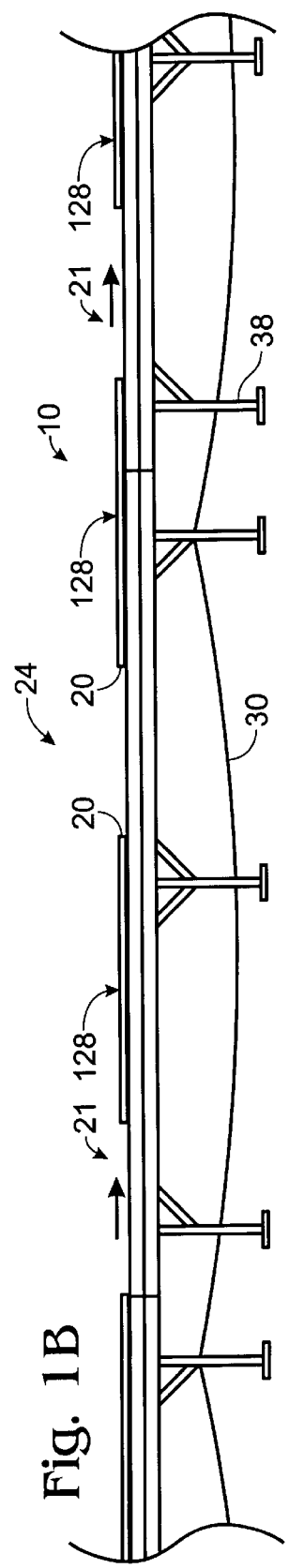
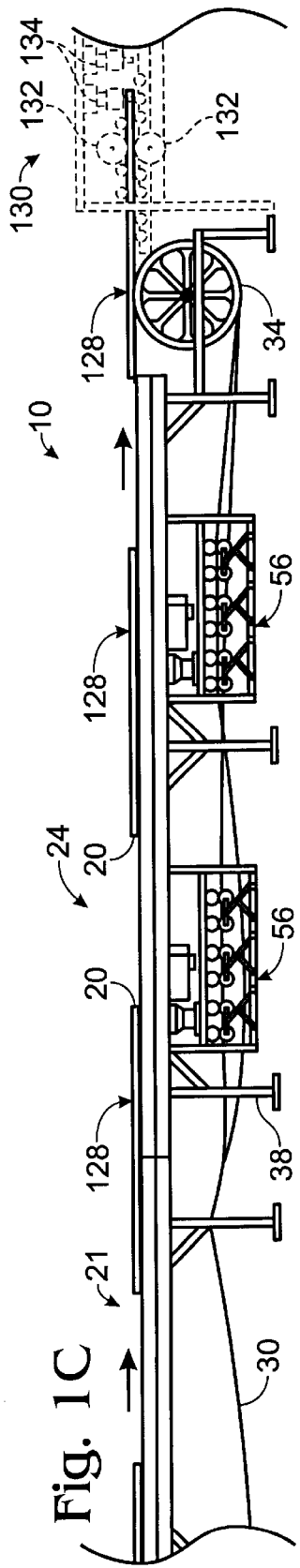

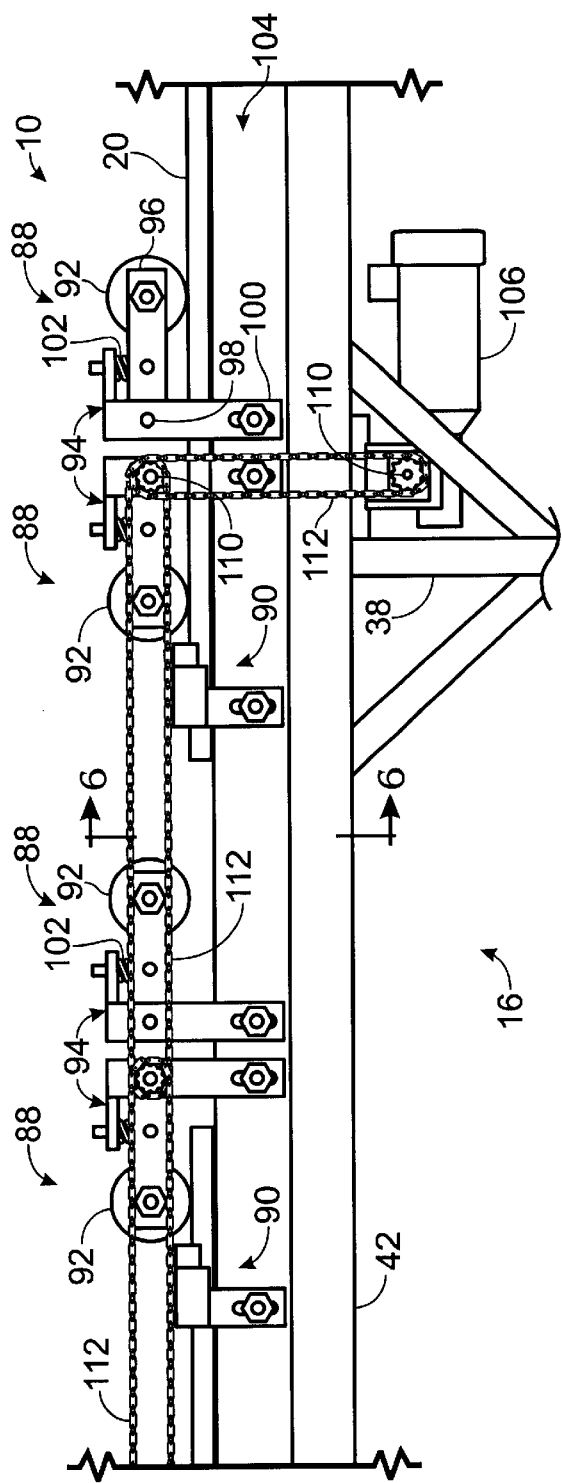
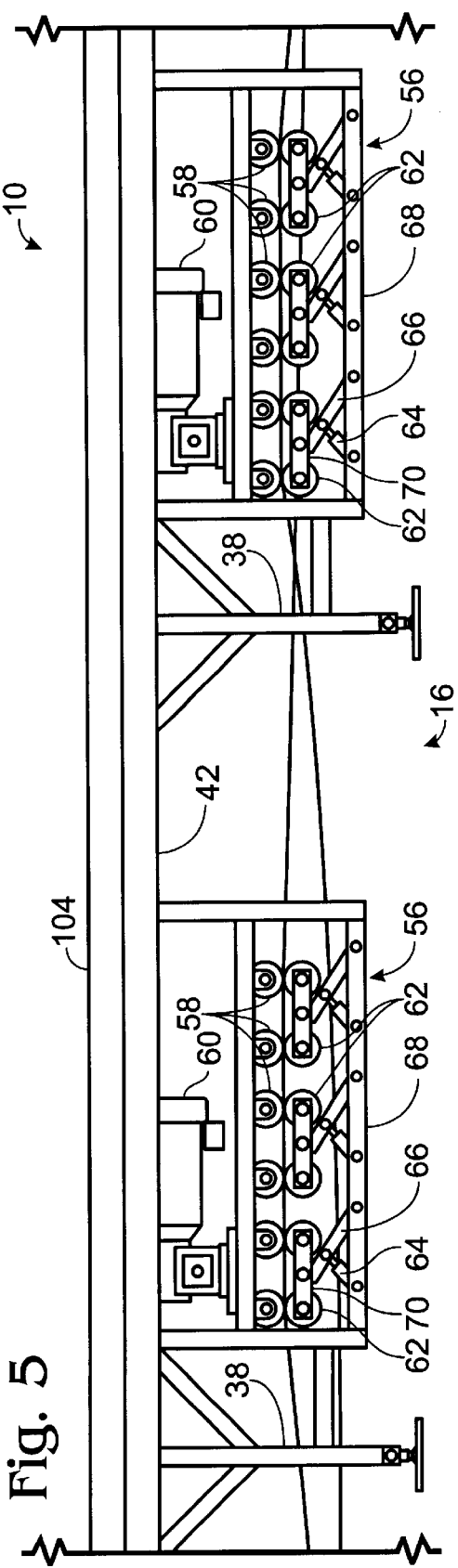
Fig. 4
Fig. 5

POLYURETHANE CASTING SYSTEM AND METHOD

BACKGROUND OF THE INVENTION

The present invention relates to a polyurethane casting system and method.

Polyurethanes are polymers formed by combining a diol or polyol and an isocyanate. A diol is a dihydric alcohol having two hydroxyl (OH) groups, and a polyol is polyhydric alcohol having three or more hydroxyl groups. When combined, hydroxyl groups of the diol or polyol react with isocyanate (NCO) groups of the isocyanate to cause cross linking within the resulting polymer according to the general formula $R_1NCO + R_2OH \rightarrow R_1NHCOOR_2$.

Polyurethane coatings are used in a wide variety of products to protect a less durable material, such as wood, from abrasion or weather damage. For such an application, it is desirable to produce a polyurethane coating that is abrasion resistant and weather resistant. Typically, such coatings are applied by brushing, spraying, or dipping processes.

U.S. Pat. No. 5,344,490 to Roosen et al. discloses a plasticized gypsum composition in the form of a polyurethane that may be used to coat wood. Bulk gypsum typically is composed primarily of dihydrous gypsum ($CaSO_4 \cdot 2H_2O$), with smaller amounts of anhydrous gypsum ($CaSO_4$), hemihydrous gypsum ($2CaSO_4 \cdot H_2O$), and hexhydrous gypsum ($CaSO_4 \cdot 6H_2O$) contained therein.

Use of gypsum as a filler in polyurethane coatings causes several problems. The amount of water contained within a given quantity of bulk gypsum is difficult to predict because the amounts of anhydrous, hemihydrous, and hexhydrous gypsum will vary. At high temperatures during curing, some of the water present in the gypsum may separate from the gypsum, thus freeing the water to react with isocyanate in the polyurethane mixture to form a polyurea and carbon dioxide. Carbon dioxide produced during the formation of a polyurethane acts as a blowing agent, and causes the polyurethane to foam. Because the amount of water in gypsum is difficult to predict, the density of the resultant polyurethane foam also is difficult to predict and control.

To control water content, gypsum may be refined by baking out the water to produce anhydrous gypsum. However, baking consumes valuable time and energy. Likewise, refined anhydrous gypsum may be purchased from suppliers, but it is much more costly than bulk gypsum. In addition, anhydrous gypsum requires careful handling during shipping and manufacturing, so as not to expose it to water in the atmosphere or elsewhere, which it will readily absorb. These handling procedures are costly, and further make use of anhydrous gypsum expensive.

Another problem is that gypsum tends to soak up water present in the polyurethane reactants, further making it difficult to predict the amount of carbon dioxide that will be available to act as a blowing agent in the polyurethane reaction. For example, water added to produce additional foaming in a polyurethane reaction, or water present in castor oil or another polyol, may be absorbed by the gypsum.

In addition, the polyurethane reaction is exothermic, and heat from the reaction may cause water to separate from the gypsum, with less heat being required to separate water molecules from polyhydrous gypsum compounds than from hemihydrous or dihydrous compounds. As described above, water released from the gypsum will adversely and unpredictably affect foaming of the polyurethane. Thus, when using gypsum, the cure temperature of the polyurethane must be kept low to avoid release of water in the gypsum, thereby extending the total cure time and cycle time per polyurethane part.

Some water will remain attached to the gypsum through the curing process. This water later may separate from the gypsum when the cured polyurethane is exposed to high temperatures, as may occur upon direct exposure to sunlight. This may leave a cleaved and cratered surface on the polyurethane, making gypsum unacceptable for outdoor applications such as a south-facing wall.

Another problem with the use of gypsum is that it forms fluid mixtures that exhibit poor flowing characteristics when combined with other polyurethane constituents such as ethylene glycol and glycerin. The resulting gypsum mixture does not easily flow under the influence of gravity, and is therefore difficult to move from location to location during the polyurethane manufacturing process.

Forming a polyurethane coating on a substrate traditionally is accomplished by brushing, spraying, or dipping processes. None of these processes is capable of forming a polyurethane coating in a complex, three-dimensional shape, with features such as radii, surface texture, etc.

SUMMARY OF THE INVENTION

According to a preferred embodiment of the present invention, a mixture for forming a polyurethane is provided. The mixture typically includes a slurry including castor oil and calcium carbonate. Typically, the calcium carbonate is present in the slurry in a range of between about 40% and 70% by weight and the castor oil is present in the slurry in a range of between about 20% and 60% by weight. The mixture also includes an isocyanate mixed into the slurry such that isocyanate forms between about 10% and 50% by weight of the resulting mixture, the remainder of the resulting mixture being slurry. The mixture also may include a chain extender, cross-linking agent, or polymerization catalyst.

According to another preferred embodiment of the present invention, a polyurethane mixture is provided, including a slurry that includes about 33% castor oil, about 61% calcium carbonate, about 2% ethylene glycol, about 2% glycerin, about 1% to 2% titanium dioxide, about 0.1% desiccant, about 0.1% to 0.2% organotin, and an isocyanate mixed with the slurry such that the isocyanate forms about 20% to 25% of the resulting mixture, the slurry being the remainder of the resulting mixture.

According to another preferred embodiment of the present invention, a method of forming a polyurethane is provided. The method typically includes mixing castor oil and calcium carbonate to form a slurry, such that the calcium carbonate forms between about 40% to 70% of the slurry and the castor oil forms between about 20% and 60% of the slurry, adding an isocyanate to the slurry such that the isocyanate forms between about 10% and 50% of a resulting mixture, the remainder of the mixture being slurry, and mixing the isocyanate and the slurry, such that the isocyanate and slurry polymerize and form the polyurethane. The method also may include mixing a chain extender, cross-linking agent, or polymerization catalyst into the slurry.

According to another preferred embodiment of the present invention, a polyurethane casting system is provided. The polyurethane casting system includes a belt mold and a dispenser configured to deliver a polyurethane mixture to the belt mold. The polyurethane casting system also includes a loading mechanism configured to place a substrate onto the belt mold adjacent the polyurethane mixture. Typically, the polyurethane mixture is configured to bond to the substrate to form an integral article, and the integral article is configured to be removed from the belt mold as a unit. The casting system may also include a guide assembly for holding the substrate adjacent the polyurethane mixture on the belt mold, and a curing region for at least partially curing the polyurethane mixture.

According to another preferred embodiment of the present invention, a method of manufacturing an article is provided. The method includes mixing a polyurethane composition and dispensing the polyurethane composition onto a belt mold. The method also includes placing a substrate onto the belt mold adjacent the polyurethane composition, and at least partially curing the polyurethane composition on the belt mold to adhere the polyurethane composition to the substrate and form an integral article.

According to another preferred embodiment of the present invention, a manufactured article is provided. The manufactured article typically includes a substrate and an at least partially cured polyurethane composition positioned adjacent the substrate, where the partially cured polyurethane composition is formed from mixture including about 10% to 50% isocyanate and about 50% to 90% slurry. The slurry typically includes about 40% to 70% calcium carbonate and about 20% to 60% castor oil.

According to another preferred embodiment of the present invention, a polyurethane product is provided, the polyurethane product being formed by a process including mixing an alcohol having at least two hydroxyl groups and calcium carbonate to form a slurry, such that the calcium carbonate forms between about 40% and 70% of the slurry, adding an isocyanate to the slurry to form a resulting mixture, the isocyanate being added in an amount effective to form a polyurethane, dispensing the resulting mixture into a belt mold, positioning a substrate adjacent the resulting mixture on the belt mold, and at least partially curing the resulting mixture on the belt mold to adhere the resulting mixture to the substrate.

BRIEF DESCRIPTION OF THE DRAWINGS

FIG. 1A is a fragmentary side elevation view of a casting system according to a preferred embodiment of the present invention.

FIG. 1B is a continuation of the side view of the casting system of FIG. 1A.

FIG. 1C is a continuation of the side view of the casting system of FIG. 1B.

FIG. 4 is a detailed side elevation view of a guide assembly of the casting system of FIGS. 1A–1C.

FIG. 5 is a detailed side elevation view of a pair of drive assemblies of the casting system of FIGS. 1A–1C.

DETAILED DESCRIPTION OF THE PREFERRED EMBODIMENTS

Composition

Figure 2:
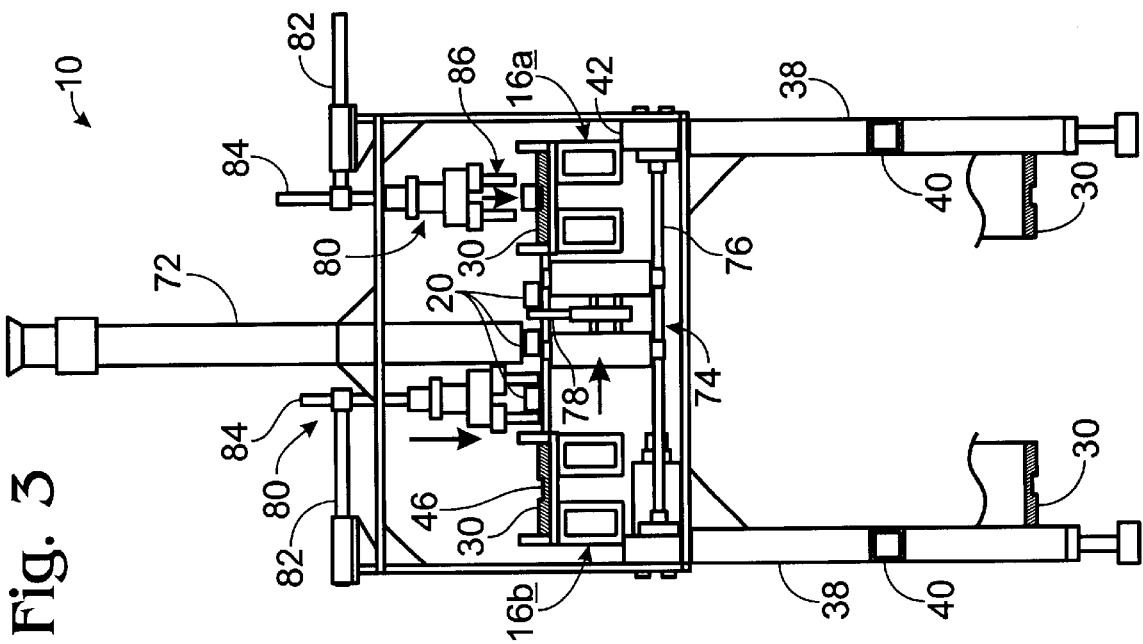
FIG. 2 is an end elevation view of a loading mechanism taken along line 2—2 of FIG. 1A.

According to one preferred embodiment of the present invention, a polyurethane composition may be formed by combining a polyol or diol and an isocyanate in amounts effective to form a polyurethane. Typically, castor oil, a polyol, is used. The castor oil may be of virtually any type, including those castor oils commercially available under the names #1 Import Castor Oil, Castor Oil Low Moisture, and Urethane Grade Castor Oil. Alternatively, another polyol or diol suitable to form a polyurethane may be used. Hereafter, for ease of explanation reference will be made only to polyols, but it should be understood that the following description also applies to diols.

The isocyanate of the polyurethane composition typically is polymeric methyl diphenyl diisocyanate, an aromatic isocyanate that has a lower vapor pressure and is thus safer than many monomeric isocyanates that have higher vapor pressures. Alternatively, an aliphatic isocyanate may be used to achieve improved resistance to ultraviolet light. In addition, a monomeric isocyanate, such as monomeric methyl diphenyl diisocyanate, or another isocyanate suitable to form a polyurethane, may be used.

The polyurethane composition also includes calcium carbonate, which acts as a filler within the composition. Typically, calcium carbonate is less expensive by weight than the other ingredients of the polyurethane composition and, therefore, it decreases the overall cost of the polyurethane composition, while typically adding strength. Calcium carbonate is used because it is more miscible than other fillers, such as gypsum, typically does not have water attached to it which may be released and interfere with the polyurethane reaction, and does not absorb water present in other polyurethane reactants. These properties enable a calcium carbonate-filled polyurethane mixture to exhibit more predictable foaming characteristics and cure at a higher temperature than a gypsum-filled mixture. In addition, certain additives used to strengthen the polyurethane such as chain extenders and other polyhydric alcohols, may be added to the calcium carbonate mixture in amounts that would make a gypsun-filled mixture difficult to flow. Finally, calcium carbonate has a relatively low hardness, and causes minimal damage to machinery such as pumps, mixers, and augers.

Typically, the castor oil is mixed with the calcium carbonate to form a slurry. Up to about 80% of the slurry may be calcium carbonate, the remainder being the polyol and other components. Typically, calcium carbonate forms between about 40% and 70% of the slurry and castor oil or another polyol forms between about 20% and 60% of the slurry. Other polyurethane components may also be added to the slurry. In a preferred embodiment, between about 55% and 65% of the slurry is calcium carbonate and, in a particularly preferred embodiment, approximately 61% of the slurry is calcium carbonate. In a preferred embodiment, castor oil forms between about 30% and 35% of the slurry, and in a particularly preferred embodiment approximately 33% of the slurry. The castor oil may be heated, for example, to between about 100° and 110° F. to reduce its viscosity before mixing. Alternatively, the castor oil may be heated to a higher or lower temperature, or not heated at all.

Next, an isocyanate is mixed into the slurry in amounts effective to form a resultant polyurethane mixture. In one embodiment, the polyurethane mixture contains between about 10% and 50% isocyanate by weight before curing, the remaining 50% to 90% of the polyurethane mixture being slurry. In a preferred embodiment, the mixture includes about 20% to 25% isocyanate, and in a particularly preferred embodiment, approximately 22% isocyanate by weight. Before mixing, the isocyanate may be kept under a diy nitrogen blanket to prevent reaction with water in the air.

Typically, the slurry components are mixed with a dispersion mixer, and heated and kept in suspension with a recirculating ribbon blender. Typically the slurry is heated to between about 80□ and 130□ F. In one preferred embodiment, the slurry is heated to between about 100□ and 120□ F., and in a particularly preferred embodiment to approximately 110□ F. Alternatively, the slurry may be heated to some other temperature, or may not be heated.

Isocyanate typically is added to the slurry by a metering and mixing unit configured to meter an appropriate amount of isocyanate and mix the isocyanate into the slurry. Typically, the metering and mixing unit includes a low pressure barrel mixer with a serrated screw and is located about 1 and 5 inches upstream of the end of the nozzle. Alternatively, the metering and mixing unit may include another type of mixer, and may be located at another location upstream of the nozzle. In addition, the slurry components and isocyanate may be mixed in multiple mixing steps, and the isocyanate may be added at some other time before or after the slurry is dispensed from the nozzle. Alternatively, vitually any other suitable mixing devices may be used to mix the slurry components and isocyanate. Mixing may add as much as 20° F. to the temperature of the slurry.

During the mixing of the slurry, air may be injected into the slurry, thereby entraining the air into the slurry and increasing the volume of the slurry. Preferably, air is introduced to the slurry before the slurry is combined with the isocyanate. This may occur, for example, at the dispersion mixer, ribbon blender, metering and mixing unit, or at some other location. Entraining air into the slurry may be used to add a predetermined amount of volume to the resultant polyurethane mixture in a predictable manner, and may be used as an alternative to or in combination with blowing agents that induce foaming within the polyurethane reaction.

The slurry may include a chain extender in the form of a dihydric alcohol or arnine. Chain extenders are added to the slurry to lengthen the polymer chains in the polyurethane reaction, thereby strengthening the resulting cross-linked polyurethane composition. Typically, the chain extender is ethylene glycol and forms up to about 10% of the slurry mixture by weight. In a particularly preferred embodiment, the slurry is approximately 2% ethylene glycol by weight. Alternatively, a hexane diol, ethylenediamine, or other suitable chain extender, may be used.

The slurry also may include one or more polyhydric alcohols or amines as cross-linking agents, which strengthen the resulting polyurethane by creating bonds between its polymer chains. In one embodiment, the cross-linking agent is glycerin and forms up to about 10% by weight of the slurry. In a particularly preferred embodiment, the slurry contains approximately 2% glycerin by weight. Alternatively, a sucrose polyol, amine-based polyol, or other suitable cross-linking agent may be used.

The slurry also may include a pigment, such as titanium dioxide, to add color and act as a physical UV inhibitor in the resulting polyurethane composition. Typically, up to about 5% of the slurry by weight is titanium dioxide. A particularly preferred embodiment includes a slurry with approximately 1% to 2% by weight titanium dioxide. Alternatively, another pigment, such as carbon black, may be used.

In addition, the slurry may include water, which will react with the isocyanates to produce a polyurea and a carbon dioxide. The carbon dioxide acts as a blowing agent in the polyurethane reaction, and causes the polyurethane to foam. Thus, water may be added to control the density of the foam in the resulting polyurethane composition.

A water scavenger or desiccant also may be added to attract any water present in the polyurethane mixture to control foaming. Typically, the desiccant is a molecular sieve or zeolite, such as the zeolite sold under the tradename Baylith®, available from Bayer AG, of Leverkusen, Germany, and is added to form up to about 1% of the slurry by weight. In a particularly preferred embodiment, a zeolite forms approximately 0.1% of the slurry by weight. Water also may be scavenged by adding an orthoester, monoisocyanate, or other suitable dessicant, to the slurry.

In addition, the slurry may contain a polymerization catalyst, also referred to as an accelerator, which acts to speed the polyurethane reaction. Typically, the catalyst is an organometallic compound, such as an organotin, and forms up to about 0.5% of the slurry by weight. In a preferred embodiment, an organotin forms approximately 0.1% to 0.2% of the slurry by weight, and in a particularly preferred embodiment the organotin is dibutyl tin dilaurate. Alternatively, a lewis acid, an amine catalyst such as triethylenediamine, potassium octoate, or another suitable polymerization catalyst, may be used.

Fire retardant materials such as alumina trihydrate, zinc borate, or other materials, also may be added to the slurry to make the resulting polyurethane resistant to fire. In addition, conditioners such as surfactants, propylene carbonate, or diethelyne glycol may be added to the slurry to reduce or increase air entrapment and/or alter the cell size of the resultant polyurethane foam.

The following formulation illustrates one embodiment of the invention. Many other variations are possible without departing from the spirit and scope of the invention.

Slurry (about 78% of mixture by weight)
 About 61 parts by weight calcium carbonate
 About 2 parts by weight ethylene glycol
 About 33.5 parts by weight castor oil
 About 2 parts by weight glycerin
 About 1.3 parts by weight titanium dioxide
 About 0.1 parts by weight desiccant
 About 0.1 parts by weight organotin
Isocyanate (about 22% of mixture by weight)
 polymeric methyl diphenyl diisocyanate Casting System and Method Referring now to FIGS. 1A–1C, a polyurethane casting system is shown generally at 10. Casting system 10 includes a polyurethane dispenser 12 configured to dispense a polyurethane mixture 14 as described above onto a conveyor 16, a loading mechanism 18 configured to place a substrate 20 on conveyor 16 adjacent the polyurethane mixture, a guide assembly 22 configured to hold the substrate against polyurethane mixture, and a curing region 24 in which the polyurethane mixture may cure further.

As shown in FIG. 1A, dispenser 12 typically includes a nozzle 26 mounted to a support 28. The nozzle is configured to receive slurry from an upstream source, such as a mixer or ribbon blender. The nozzle typically includes an associated metering and mixing unit configured to receive an isocyanate and mix the isocyanate at a predetermined ratio into the slurry to form polyurethane mixture 14. After mixing, the nozzle is configured to dispense the polyurethane mixture onto conveyor 16. Nozzle 26 is configured to transition between an operational position above the belt and a purge position, shown by dashed lines at 26*a*. In the purge position, a purge fluid such as a solvent or detergent may be passed through the nozzle for cleaning.

Typically, dispenser 12 is configured to deliver a continuous stream of polyurethane mixture to the conveyor 16. Alternatively, the nozzle may be configured to deliver an intermittent stream of polyurethane mixture to the conveyor, with gaps in the stream corresponding to gaps 21 between subsequently loaded substrates 20. Gaps 21 are shown exaggerated in FIGS. 1A–1C for clarity of explanation only. Typically, each gap is less than one inch in length. Alternatively, a longer or shorter gap may be used. The polyurethane mixture usually is dispensed by nozzle 26 substantially immediately or within seconds after being mixed with the isocyanate, such that the mixture has had little time to cure.

Conveyor 16 typically includes a belt mold 30, configured to receive the polyurethane mixture from the nozzle 26. Belt mold 30 rotates around an upstream wheel 32 at an upstream end of the conveyor 16, and around a downstream wheel 34 at a downstream end of conveyor 16. Upstream and downstream wheels 32, 34 are supported by a frame 36. Frame 36 typically includes legs 38 and horizontal support members 40, 42. Alternatively, virtually any other suitable frame structure may be used.

Figure 7:
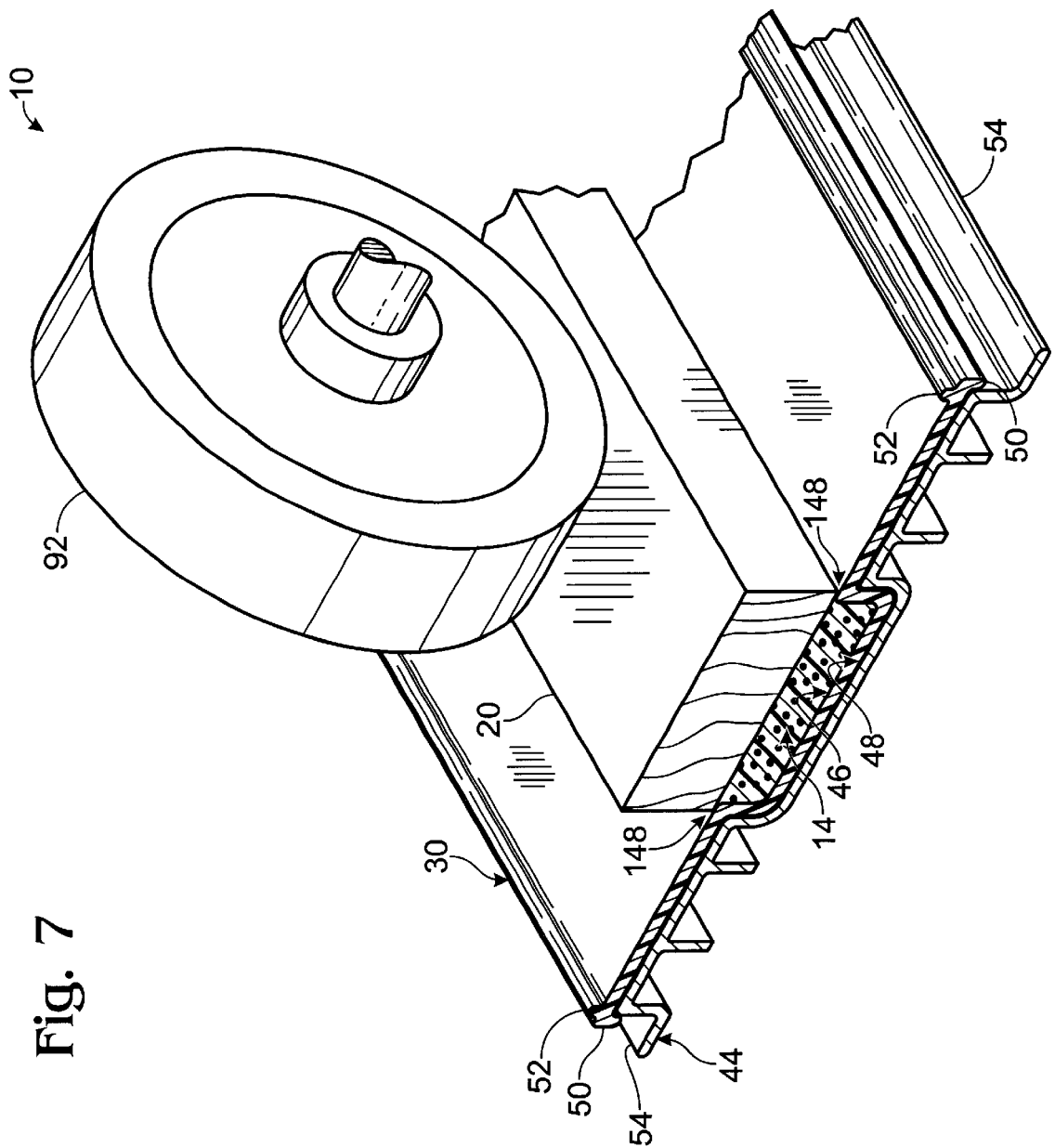
FIG. 7 is a detailed isometic sectional view of a belt and understructure of FIG. 4.

Between upstream wheel 32 and downstream wheel 34, belt mold 30 rests upon and is guided by an understructure 44, as shown in FIG. 7. Typically, understructure 44 is an aluminum extrusion, and belt mold 30 is a low-density polyethylene belt, such that the belt mold and aluminum extrusion slide freely against each other and the polyurethane mixture may be easily removed from the belt mold upon partially curing without the use of mold release agents. Alternatively, other materials may be used, such as high density polyethylene, polytetrafluoroethylene (PTFE), etc., for the belt mold, and/or mold release agents may be used to facilitate removal of the polyurethane from the belt mold. A low friction coating may be applied to understructure 44 to reduce friction between belt mold 30 and understructure 44. Lubricants also may be used to reduce friction between belt mold 30 and understructure 44.

Belt mold 30 is typically a continuously cast extrusion. The extrusion can be formed into a seamless loop by melting or welding the ends of the extrusion together. Any imperfections caused by welding may be smoothed out by further application of heat to the weld by, for example, a metal heater in the shape of the surface of the belt mold.

Figure 6:
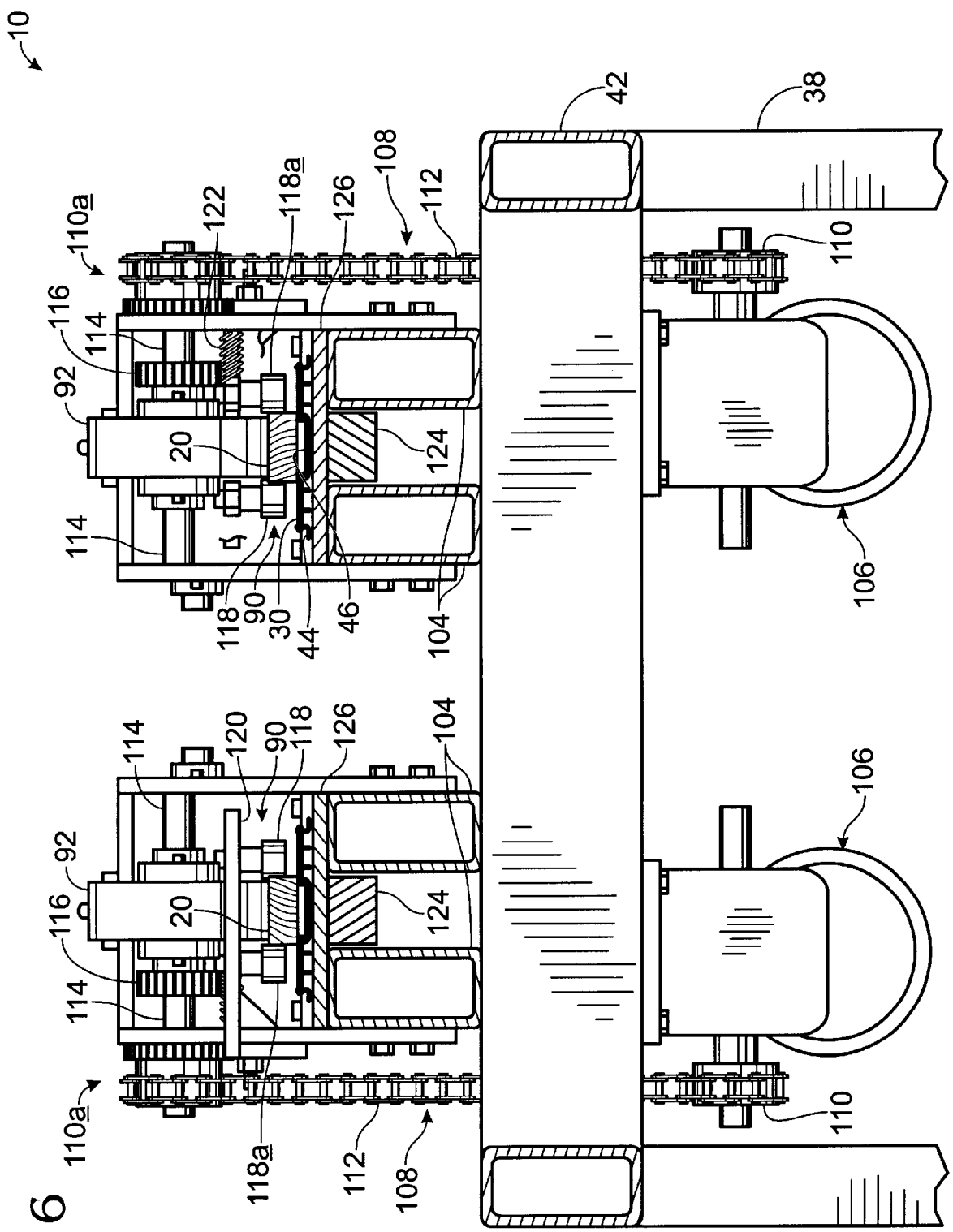
FIG. 6 is an end elevation sectional view taken along line 6—6 of FIG. 4.

As shown in FIG. 7, belt mold 30 typically includes a well 46, shown in FIG. 6, into which the polyurethane mixture is dispensed from nozzle 26. Understructure 44 also includes a recess 48 configured to conform to the shape of the well 46. Alternatively, the belt mold may be flat, convexly curved, or some other shape. Belt mold 30 includes an overhang portion to keep the belt mold aligned on understructure 44, and an overflow dam 52 to keep any polyurethane mixture that spills out from well 46 from overflowing the belt mold and contaminating surrounding machinery. Understructure 44 also includes mounting flanges 54.

As shown in FIG. 5, conveyor 16 further includes a drive assembly 56 configured to rollingly engage and drive the belt mold 30. Drive assembly 56 includes a plurality of upper wheels 58 driven by motor 60 via a belt or other power transfer mechanism (not shown), and a plurality of lower wheels 62. Lower wheels 62 are biased upward against belt mold 30 by a spring or hydraulic cylinder 64, which pushes against member 66. Member 66 is hingedly attached to frame member 68 at a bottom end and to cross member 70 at a top end. As spring 64 extends, wheels 62 on cross member 70 are urged against belt mold 30 with substantially equal force. Alternatively, another suitable drive mechanism may be employed to drive belt mold 30 around conveyor 16.

Figure 3:
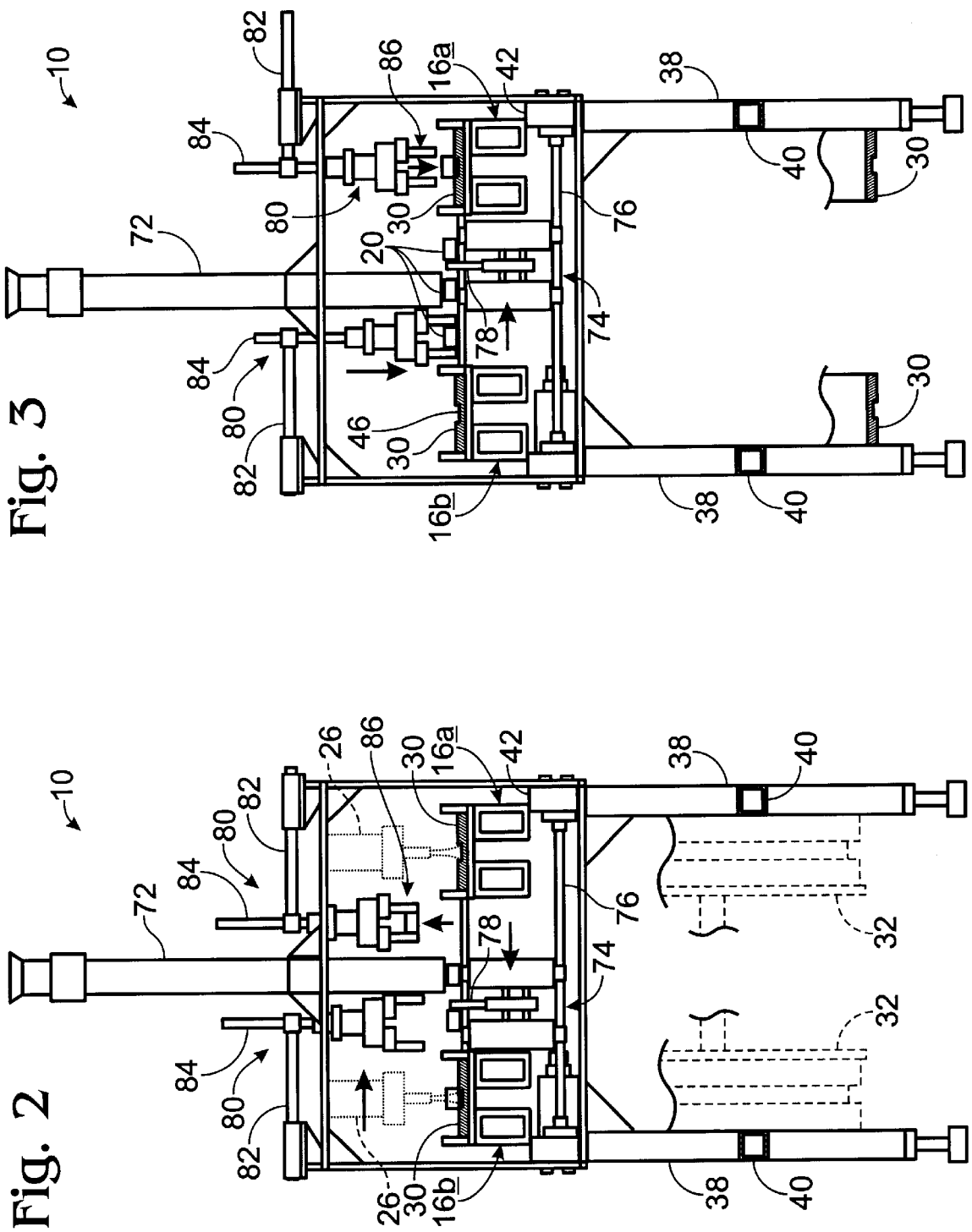
FIG. 3 is an end view of another configuration of the loading mechanism of FIG. 2.

As shown in FIGS. 1A, 2, and 3, casting system 10 also typically includes a loader 18 configured to place a substrate 20 over the polyurethane mixture 14 on belt mold 30. Loader 18 typically includes a magazine 72 configured to hold a plurality of substrates 20 in a vertical column. Substrates 20 are gravity fed from a bottom outlet of magazine 72, at which point they are alternately distributed to a right-hand conveyor 16*a*, and a left-hand conveyor 16*b* by a distribution mechanism 74.

Distribution mechanism 74 is configured to slide from side to side on horizontal bar 76. Vertical paddle 78 urges successive substrates fed from the bottom of magazine 72 to either the right or left, for pick-up by placement mechanism 80. Placement mechanism 80 is configured for horizontal and vertical movement along bars 82 and 84, respectively, and includes grippers 86 configured to grab substrate 20 and place it on belt mold 30. The substrate typically is placed such that it completely spans well 46, and is supported on both sides of well 46. Alternatively, the substrate may be placed such that it only partially spans well 46, or does not span any well.

As shown in FIG. 4, casting system 10 typically includes a guide assembly 22 including a plurality of vertical guides 88 and horizontal guides 90. Typically, vertical guides 88 include a top roller 92 mounted to a top roller support member 94. Top roller support member 94 typically includes a lateral portion 96 hinged about pin 98 to vertical member 100. Lateral portion 96 is biased toward the belt by a spring 102, such that the roller is biased against the substrate as the substrate passes under the roller. Top roller support member 94 typically is mounted at a bottom to tubular member 104 of frame 36.

As shown in FIG. 6, top rollers 92 are driven by motor 106 via gear and chain linkage 108. Linkage 108 includes a plurality of sprockets 110 rotatively connected by a plurality of chains 112. Sprocket 110*a* drives an associated axle 114, which is connected via a belt to a cog wheel 116. Cog wheel 116 is mounted along with top roller 92 on a common axle (not shown), and drives top roller 92.

Horizontal guides 90 typically include a pair of side rollers 118 mounted to a side roller support member 120 such that the side rollers are positioned on opposite sides of substrate 20. Side roller 118*a* is biased toward the substrate by a spring 122 attached to a pivotable portion of side roller support member 120 configured to move laterally toward and away from substrate 20. Side roller support member 120 typically is mounted at a bottom end to a tubular member 104 of frame 36. Horizontal rollers 118 function in combination with top roller 92 to align and hold substrate 20 over well 46 of belt mold 30 while the polyurethane mixture 14 in the well partially cures and adheres itself to the substrate.

Casting system 10 also includes a heater 124 positioned below the understructure 44. The heater is configured to supply heat to the understructure to deter heat loss from the exothermic polymerization reaction occurring in the polyurethane mixture 14, thereby speeding the polymerization reaction. Typically, the heater is positioned below plate 126, adjacent the understructure, such that it is in thermal communication with the understructure. Alternatively, the heater may be mounted directly to the understructure. The heater may be configured to supply varying amounts of heat to the reaction, and may serve to heat the polyurethane mixture, or merely slow heat loss from the polyurethane mixture. Alternatively, casting system 10 may not include a heater.

After the substrate partially adheres to the polyurethane mixture, it travels on the belt mold into curing region 24 in which the polyurethane mixture 14 is allowed to further cure and adhere to substrate 20 to form an integral article 128. Typically, polyurethane mixture 14 is cured sufficiently by the time integral article 128 reaches downstream wheel 34, such that it may peel off the belt mold. Typically, integral article 128 is a door stile configured to be disposed adjacent the edge of a door. Alternatively, integral article 128 may be virtually any other product having a substrate and polyurethane coating.

As shown in FIG. 1C, casting system 10 also may include a downstream machining assembly 130, which is configured to receive the integral article as it peels off belt mold 30 at downstream wheel 34. Downstream machining assembly 130 typically includes trimming and slotting saws 132 and routers 134. Trimming and slotting saws 132 typically are configured to cut longitudinal slots in both a bottom and top of article 128. Routers 134 are configured to impart radii to the edges of article 128 and/or cut slots into the sides, top, and/or bottom of article 128. Downstream machining assembly 130 also may include other machining components, such as sanders, milling machines, lathes, etc.

Figure 8:
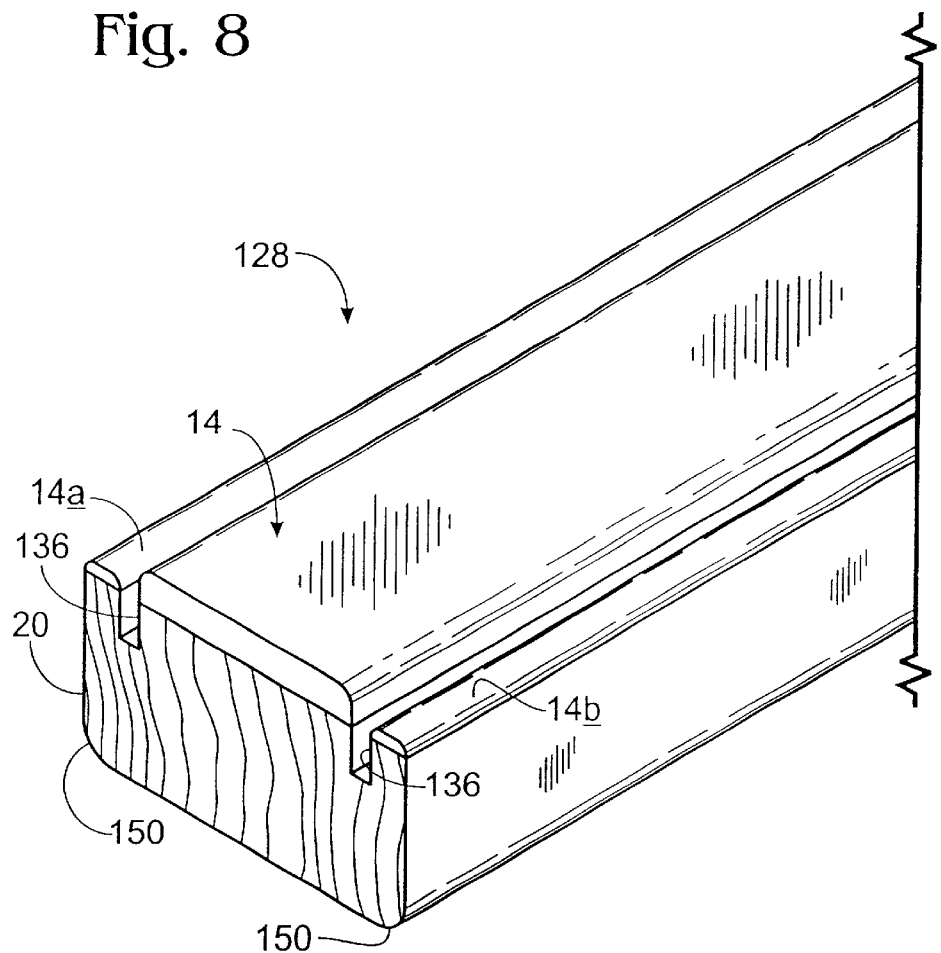
FIG. 8 is an isometric view of a cast article according to one embodiment of the present invention.
Figure 9:
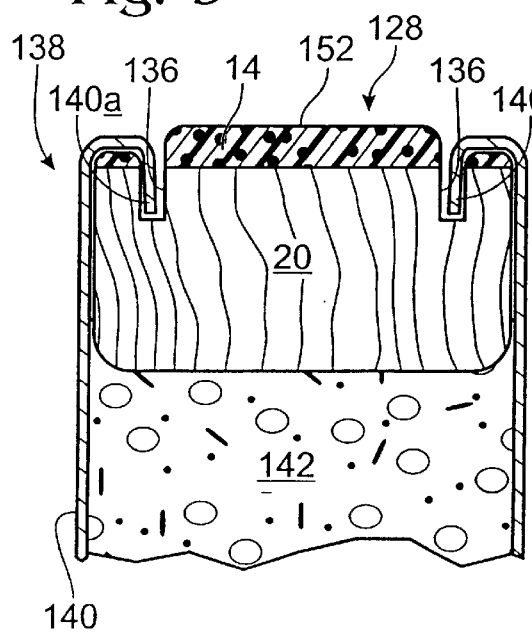
FIG. 9 is a end elevation sectional view of the cast article of FIG. 8.
Figure 10:
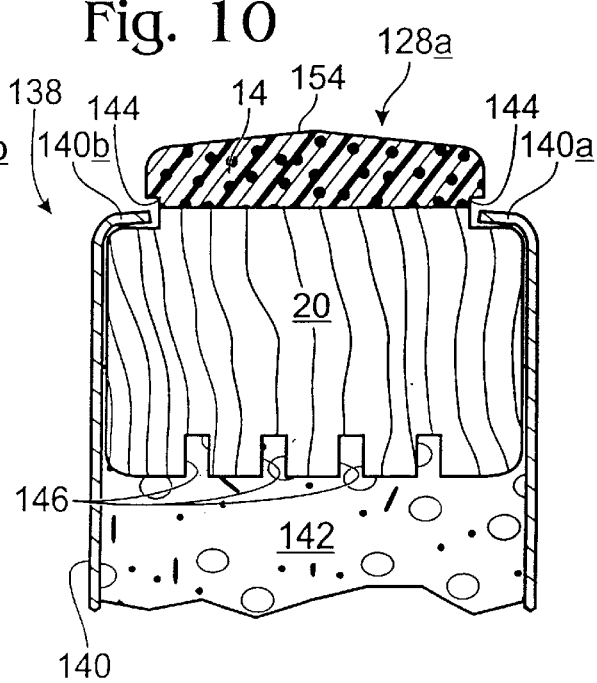
FIG. 10 is an end elevation sectional view of a cast article manufactured according to another embodiment of present invention.

FIGS. 8–10 show one embodiment of integral article 128 manufactured according to the present invention in the form of a door stile. As shown in FIG. 8, door stile 128 typically includes a substrate 20 adhered to a polyurethane mixture 14. Typically, polyurethane mixture 14 is at least partially cured and hardened. Door stile 128 also may include flash portions 14a and 14b of polyurethane mixture formed as polyurethane mixture is squeezed out from well 46 along belt/substrate interface regions 148. Door stile 128 also may include slots 136, extending completely through the polyurethane mixture and into the substrate, the slots being cut by slotting saws 132. Alternatively, the door stile may include slots that extend only into the substrate or polyurethane, or may contain no slots. The door stile also may include radii 150 cut by routers 134.

As shown in FIG. 9, a door 138 may be for eed by molding an outer skin 140 of steel, wood veneer, or other material around the door stile, such that end portions 140a, 140b extend into slots 136. An insulating foam core 142 may be disposed with in skin 140 and attached to substrate 20. Cured polyurethane composition or mixture 14 extends outward from the skin 140, and may include a substantially straight outer edge 152, shown in FIG. 9, a tapered outer edge 154, shown in FIG. 10, or virtually any other suitable shape, and belt mold 30 and understructure 42 may be shaped accordingly to produce edges of these shapes.

FIG. 10 shows another embodiment of a door stile 128a according to the present invention. Door stile 128a includes side slots 144 into which end portions 140a, 140b extend and back slots 146 into which insulating foam core 142 penetrates for a more secure attachment between core 142 and substrate 20. Typically, door stiles 128 and 128a may form either a hinge or lock side of door 138. In addition to door stiles 128 and 128a, the integral article produced by the casting system may be virtually any article including a substrate and a polyurethane composition, such as siding, door jams, door frames, or other components.

Figure 11:
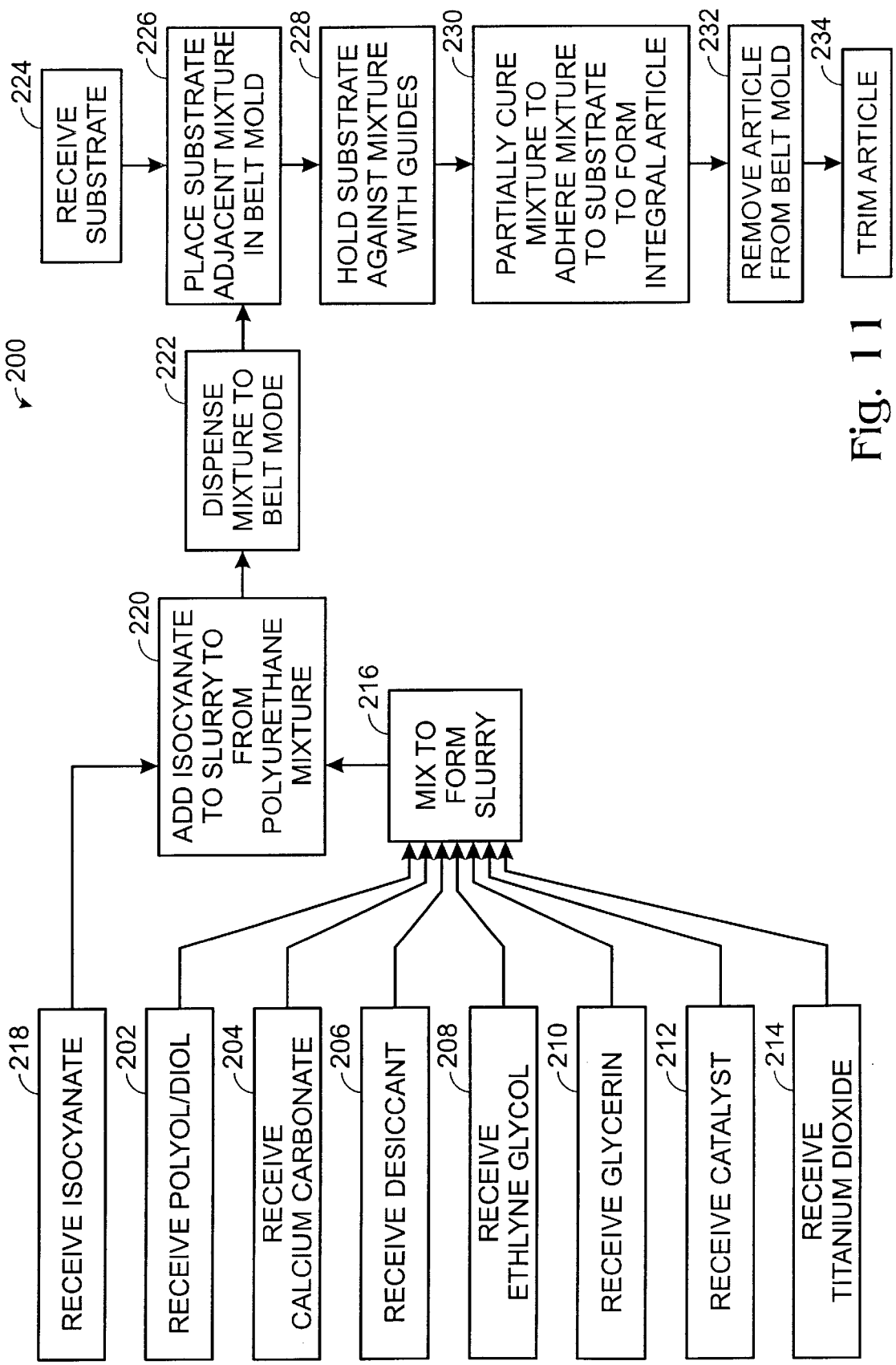
FIG. 11 is a flowchart of a process for casting polyurethane and a substrate according to one embodiment the present invention.

As shown in FIG. 11, a method 200 may be practiced for casting polyurethane on a substrate. At 202, the method includes receiving a polyol or diol. Typically, the polyol castor oil is received. Alternatively, another polyol or diol suitable to form polyurethane may be used. Typically, the castor oil is heated to reduce viscosity and pumped into a dispersion mixer for mixing into a slurry at 216. In a particularly preferred embodiment, the castor oil is heated to between about 100° and 120° F. Alternatively, the castor oil may not be heated.

At 204, the method further includes receiving calcium carbonate ($CaCO_3$). The method may include transporting the calcium carbonate with an auger to the dispersion mixer for mixing into the slurry. Alternatively, another suitable transporting or mixing process may be used.

At 206, the method typically includes receiving a desiccant to control the amount of water in the slurry, thereby controlling the amount of foaming in the polyurethane reaction. Typically, the desiccant is a zeolite, such as the molecular sieve Baylith®. Alternatively, another suitable desiccant may be used.

At 208, the method may include receiving a chain extender, such as ethylene glycol, as described above. At 210, the method may include receiving a polyhydric alcohol, such as glycerin, as described above. At 212, the method may include receiving a polymerization accelerator or catalyst, such as an organometallic compound, as described above. Finally at 214, the method may include receiving a pigment, such as titanium dioxide, as described above.

At 216, the method includes mixing the polyol/diol with the calcium carbonate, desiccant, chain extender, glycerin, accelerator, and/or pigment to form a slurry. The slurry may be heated. In one preferred embodiment the slurry is heated to between about 80° and 130° F. In a particularly preferred embodiment, the slurry is heated to approximately 110° F. After mixing, the slurry typically is recirculated to keep the slurry components in suspension. Water also may be added as needed to control foaming in the polyurethane reaction. Typical ratios of the various slurry components are described above.

At 218, the method further includes receiving an isocyanate. As described above, the isocyanate typically is a polymeric methyl diphenyl diisocyanate. Alternatively, other isocyanates suitable to form a polyurethane may be received. At 220, the method further includes adding isocyanate to the slurry in an amount effective to form a polyurethane, thereby forming a polyurethane mixture. Air may be entrained in the slurry to increase its volume, either prior to, contemporaneously with, or after the isocyanate is added to the slurry, as described above.

Use of calcium carbonate as a filler has the advantage over gypsum that forms a polyurethane mixture with a lower viscosity and is easier to pump. Because of this lower viscosity, strengthening agents such as ethylene glycol and glycerin may be added to the polyurethane mixture without making the mixture too difficult to pump.

At 222, the method includes dispensing the polyurethane mixture to a belt mold, as described above. The polyurethane mixture is typically dispensed at a temperature of between about 80° and 130° F. In one preferred embodiment of the present invention, the slurry is dispensed at a temperature of between about 100° and 120° F., and in a particularly preferred embodiment, at approximately 100° F. Alternatively, a higher or lower dispensation temperature may be used. The method further includes receiving a substrate at 224 and placing the substrate adjacent the polyurethane mixture in the belt mold. Typically, the substrate is placed at least partially over a well containing the polyurethane mixture on the belt mold.

At 228, the method typically includes holding the substrate against the polyurethane mixture with a guide assembly. The guide assembly may include top and side rollers biased to hold the substrate in a predetermined orientation relative to the belt mold and/or polyurethane mixture. Typically, the substrate passes through the guide assembly for between about 20 and 60 seconds. Alternatively, a the substrate may be held by the guides for a longer or shorter time, to achieve a predetermined degree of adherence between the substrate and polyurethane mixture.

At 230, the method includes at least partially curing the polyurethane mixture to adhere the mixture to the substrate to form an integral article. Typically, this partial curing occurs as the polyurethane mixture and substrate pass on the belt mold through a curing region for at least about 40 seconds. A longer or shorter period may alternatively be employed depending on the cure rate of the polyurethane mixture.

At 232, the method includes removing the integral article from the belt mold as a unit. The entire journey of the polyurethane mixture from dispensation on the belt mold until peeling off as an integral article typically occurs in a cycle time of between about 1:45 and 3:00 minutes, and in a particularly preferred embodiment, between about 2:10 and 2:20 minutes. Alternatively, a longer or shorter cycle time may be selected to facilitate removal of the integral article from the belt mold. This alternate curing time will depend, for example, on the curing properties of the polyurethane mixture and the friction properties of the belt mold. Finally, at 234, the method may include trimming the article and performing associated downstream machining processes, such as cutting slots and/or radii, thereby shaping the integral article.

While the invention has been disclosed in its preferred form, the specific embodiments thereof as disclosed and illustrated herein are not to be considered in a limiting sense, because numerous variations are possible. The subject matter of the invention includes all novel and non-obvious combinations and subcombinations of the various elements, features, functions, and/or properties disclosed herein. No single feature, function, element, or property of the disclosed embodiments is essential. The following claims define certain combinations and subcombinations which are regarded as novel and non-obvious. Other combinations and subcombinations of features, functions, elements, and/or properties may be claimed through amendment of the present claims or presentation of new claims in this or a related application. Such claims also are regarded as included within the subject matter of the present invention irrespective of whether they are broader, narrower, or equal in scope to the original claims.

We claim:

1. A mixture for forming a polyurethane, the mixture comprising:
   a slurry including a castor oil and calcium carbonate, the castor oil being present in the slurry in a range of between about 20% and 60% by weight and the calcium carbonate being present in the slurry in a range of between about 55% and 65% by weight; and
   an isocyanate mixed into the slurry such that isocyanate forms between about 10% and 50% by weight of the resulting mixture, the remainder of the resulting mixture being slurry.

2. The mixture of claim 1, where the isocyanate forms between about 20% and 25% of the resulting mixture.

3. The mixture of claim 2, where the isocyanate forms about 22% of the resulting mixture.

4. The mixture of claim 1, where the calcium carbonate forms about 61% of the slurry.

5. The mixture of claim 1, further comprising a chain extender present in the slurry in a range of up to about 10% by weight.

6. The mixture of claim 5, where the chain extender is about 2% by weight of the slurry.

7. The mixture of claim 5, where the chain extender is ethylene glycol.

8. The mixture of claim 1, further comprising an alcohol present in the slurry in a range of up to about 10% by weight.

9. The mixture of claim 8, where the alcohol is glycerin.

10. The mixture of claim 9, where the glycerin is about 2% by weight of the slurry.

11. The mixture of claim 1, further comprising a pigment present in the slurry in a range of up to about 5% by weight.

12. The mixture claim 11, where the pigment is titanium dioxide.

13. The mixture of claim 12, where the titanium dioxide is about 1% to 2% of the slurry by weight.

14. The mixture of claim 1, further comprising a desiccant present in the slurry in a range of up to about 1% by weight.

15. The mixture of claim 14, where the desiccant is a zeolite.

16. The mixture of claim 15, where the zeolite is about 0.1% of the slurry by weight.

17. The mixture of claim 1, further comprising a polymerization catalyst present in the slurry in a range of up to about 0.5% of the slurry by weight.

18. The mixture of claim 17, where the catalyst is an organometallic compound.

19. The mixture of claim 18, where the organometallic compound is about 0.1% to 0.2% of the slurry.

20. The mixture of claim 1, where the isocyanate is a diisocyanate.

21. The mixture of claim 20, where the diisocyanate is polymeric methyl diphenyl diisocyanate.

22. The mixture of claim 20, where the diisocyanate is monomeric methyl diphenyl diisocyanate.

23. The mixture of claim 1, where the castor oil is about 30% to 35% of the slurry.

24. A mixture for forming a polyurethane, the mixture comprising:
   a slurry including:
      about 33% castor oil;
      about 61% calcium carbonate;
      about 2% ethylene glycol;
      about 2% glycerin;
      about 1% to 2% titanium dioxide;
      about 0.1% desiccant;
      about 0.1% to 0.2% organotin; and
   an isocyanate mixed with the slurry such that the isocyanate forms about 20% to 25% of the resulting mixture, the slurry being the remainder of the resulting mixture.

25. A method of forming a polyurethane, the method comprising:
   mixing castor oil and calcium carbonate to form a slurry, such that the calciuncarbonate forms between about 55% to 65% of the slurry and the castor oi forms between about 20% to 60% of the slurry;
   adding an isocyanate to the slurry such that the isocyanate forms between about 10% and 50% of a resulting mixture, the remainder of the mixture being slurry; and
   mixing the isocyanate and the slurry, such that the isocyanate and slurry polymerize and form the polyirethane.

26. The method of claim 25, where the isocyanate is a diisocyanate, and forms between about 20% and 25% of the resulting mixture, the remainder of the resulting mixture being slurry.

27. The method of claim 26, where the isocyanate is polymeric methyl diphenyl diisocyanate.

28. The method of claim 25, further comprising heating the castor oil before mixing.

29. The method of claim 25, further comprising mixing the castor oil and calcium carbonate at a temperature of between about 80° and 130° F.

30. The method of claim 25, further comprising mixing a desiccant into the slurry.

31. The method of claim 30, where the desiccant is a zeolite, and forms up to about 1% of the slurry by weight.

32. The method of claim 25, further comprising mixing a pigment into the slurry.

33. The method of claim 32, where the pigment is titanium dioxide.

34. The method of claim 33, where the titanium dioxide forms up to about 5% of the slurry.

35. The method of claim 25, further comprising mixing a polymerization catalyst into the slurry.

36. The method of claim 35, where the polymerization catalyst is an organometallic compound.

37. The method of claim 36, where the organometallic compound forms up to about 0.5% of the slurry.

38. The method of claim 25, further comprising mixing a chain extender into the slurry.

39. The method of claim 38, where the chain extender is ethylene glycol.

40. The method of claim 39, where the ethylene glycol forms up to about 10% of the slurry by weight.

41. The method of claim 25, further comprising mixing a second alcohol with two or more hydroxyl groups into the slurry.

42. The method of claim 41, where the second alcohol is glycerin.

43. The method of claim 42, where the glycerin forms up to about 10% of the slurry.

* * * * *